(No Model.)

C. SCHALLES.
RIM CLAMP FOR WHEELS.

No. 559,612.  Patented May 5, 1896.

WITNESSES:
Paul Jahst
H. B. Brown

INVENTOR
C. Schalles
BY Munn & Co
ATTORNEYS.

UNITED STATES PATENT OFFICE.

CHARLES SCHALLES, OF CORTEZ, COLORADO.

RIM-CLAMP FOR WHEELS.

SPECIFICATION forming part of Letters Patent No. 559,612, dated May 5, 1896.

Application filed August 17, 1895. Serial No. 559,683. (No model.)

*To all whom it may concern:*

Be it known that I, CHARLES SCHALLES, of Cortez, in the county of Montezuma and State of Colorado, have invented a new and Improved Rim-Clamp for Wheels, of which the following is a full, clear, and exact description.

My invention relates to an improvement in clamps adapted for use upon the rims or fellies of wheels; and the object of the invention is to so construct a clamp that when placed in position on a rim of a wheel will insure the proper alinement or facing of the rim-sections with which it may engage, and, furthermore, to construct the clamp in such manner that while the rim-sections are under its influence the abutting ends of the said sections may be conveniently and accurately trimmed with a saw; and another object of the invention is to provide the clamp with a device for regulating its attachment to wheels of different widths and to provide a means for locking the clamps independently, in order that one of the clamps may be loosened while the other is fast upon a rim-section, enabling the freed section to assume its proper position relative to the clamped section of the rim, thereby enabling the operator to inspect the joint and ascertain if it is satisfactorily made. If not, the loosened clamp may again be secured to the rim and the joint again treated.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
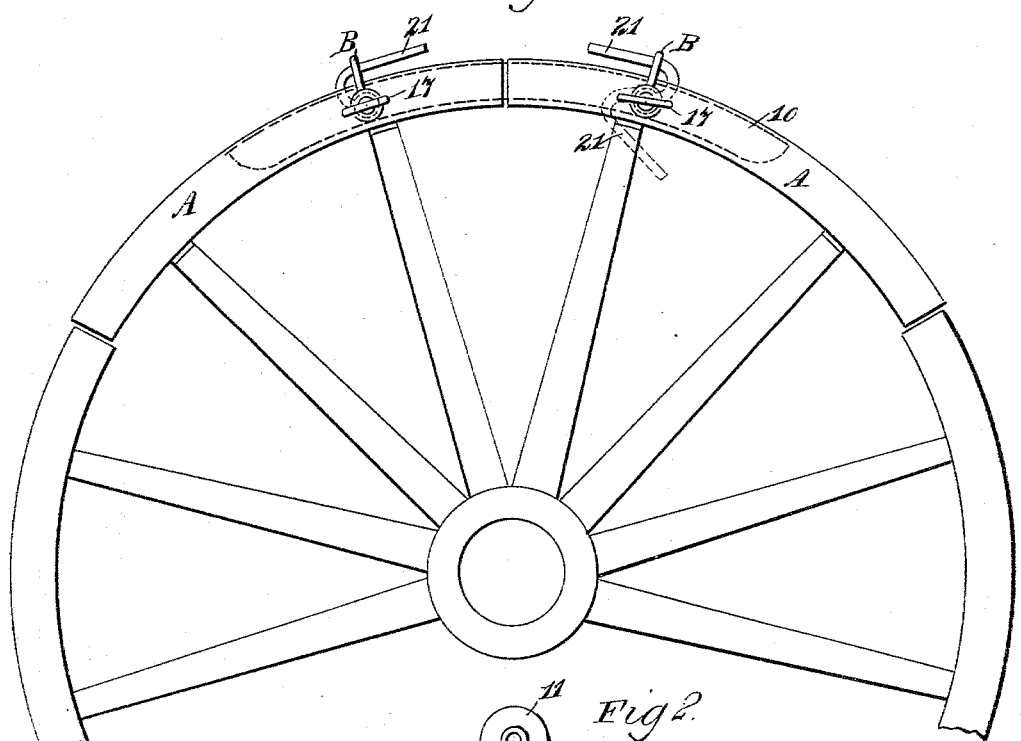
Figure 2:
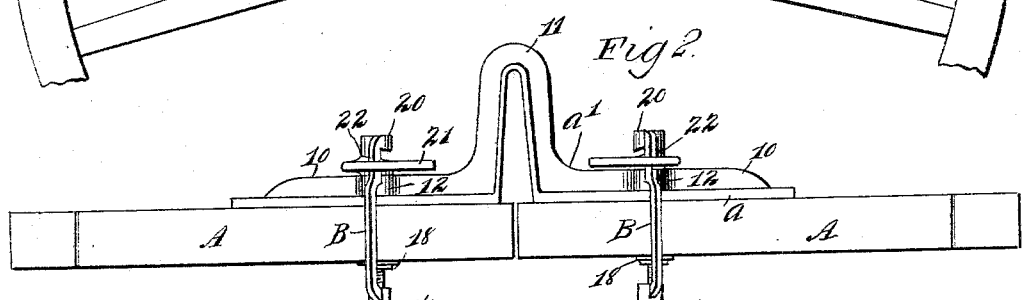
Figure 3:
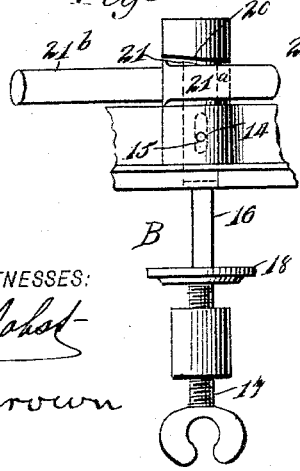
Figure 4:
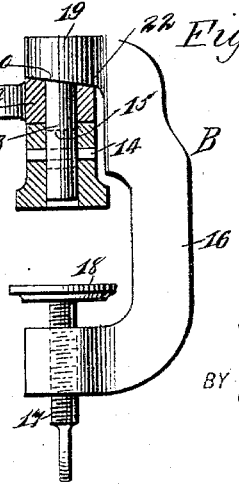

Figure 1 is a partial side elevation of a wheel, the tire being removed, and a side elevation of the clamp applied to sections of the wheel-rim. Fig. 2 is a plan view of the clamp and the rim-sections with which it is engaged. Fig. 3 is a plan view of a portion of the body of the clamp and one of the attaching or clamping devices; and Fig. 4 is a side elevation of the body portion of the said clamping device for the clamp and a section through the body of the clamp proper, a lever operating the clamp or fastening device.

The clamp consists of a segmental body-bar 10, provided at its center with a laterally-extending arch 11, whereby what may be termed the "inner" face of the body-bar is divided at the center or opposite that portion at which the arch is formed. The body-bar is preferably somewhat T-shaped in cross-section, having a vertical inner face $a$ and a horizontal outer flange-surface $a'$. The curvature of the body-bar corresponds to that of two abutting rim-sections A of the wheel, and at each side of the center of the body-bar a bearing 12 is formed therein, and in each of the said bearings a spindle 13 is mounted to slide. The spindles are held in position within their bearings by passing pins 14 through suitable apertures in the bearings, as shown in Figs. 3 and 4, and through longitudinal or elongated openings 15 made in the spindles.

Two fastening devices B are employed in connection with the body-bar of the clamp, one being located over each of the said bearings, and both of the fastening devices are of the same construction. The fastening device, as illustrated, consists of a horizontally-placed yoke 16, the inner end of the yoke being spaced some distance from the inner or bearing face of the body-bar, and at the inner end of the yoke an adjusting-screw 17 is entered, having preferably a swiveled head 18, which faces the body-bar.

The outer end of the yoke 16 is secured upon the outer extremity of a spindle 13, an eye 19 being formed on the yoke for that purpose, and the inner face of the eye is spiral, forming a cam-surface 20. A lock-lever 21 is employed for giving end movement to the spindle carrying the clamping-yoke. The lock-lever comprises a body or eye section 21ª, which is mounted to turn on the spindle in engagement with the spiral or cam face 20 of the clamping-yoke, and a handle 21ᵇ, which handle is so curved that in one position of the lever said handle will extend over the clamping-yoke and may be brought to an engagement with the flange portion $a'$ of the arch 11.

The outer face of the eye or body of the lock-lever is also provided with a spiral cam-surface, designated as 22, and when the handle of the lever is in its upper position the advanced surfaces of the spiral faces of the lever and the clamping-yoke will be in engagement, and the yoke will have been shifted outward practically for the full limit of the movement of the spindle to which it is attached, whereas when the lever is carried in a reverse direction or downward, as shown in dotted lines in Fig. 1, the clamping-yoke may be pushed inward, so as to free the rim from clamping engagement with the body-bar of the device. The adjusting-screws 17 are provided in order that the space between their heads 18 and the vertical face of the body-bar of the clamp may be practically the same as the thickness of the rim to be treated, the clamping action being brought about by manipulating the lock-levers.

In applying the clamp it is placed across the joint between two of the rim-sections, as shown in Fig. 1, and the clamping-yokes are then manipulated to hold the clamp firmly in engagement with the said rim-sections, the clamp being so placed that its front open portion will be opposite the abutting ends of the rim-sections in order that the saw may be introduced between the members of the arch and the abutting ends of the sections treated. By releasing one rim-section from the clamp after the joint has been made the said section will move to its proper position, or close to the next section, and the operator may then observe the joint and ascertain whether or not it is properly made. The clamp insures a true rim at all times and likewise insures a proper position of the spokes.

When the clamp is locked on the rim, it holds the rim in proper position until one of the levers 21 is moved in the direction of the hub of the wheel, and the clamp effectually prevents the abutting ends of the rim-sections held by it from "winding" together and holding the saw. In trimming up a wheel under the old methods there is always a tendency at the abutting ends of the rim-sections to come together before a true joint can be made, and the pressure is often so great as to prevent the saw being moved between the sections, necessitating the rim being knocked down to release the saw.

Having thus described my invention, I claim as new and desire to secure by Letters Patent—

1. A rim-clamp for wheels, the same consisting of a segmental body-bar provided at about the center of its length with a laterally-extending arch forming a break in the face of the bar adapted for engagement with the rim of the wheel, clamps located upon the body-bar on opposite sides of the arch, and lock-levers adapted for shifting and locking the clamps in their shifted position, as and for the purpose specified.

2. A rim-clamp for wheels, the same consisting of a segmental body-bar having a lateral arch formed upon its ends, dividing the inner or contact face of the body-bar, clamping-yokes slidably connected with the body-bar, adjusting-screws carried by the said yokes, and lock-levers adapted for locking and shifting the yokes, as and for the purpose specified.

3. A clamp for the rim of vehicle-wheels, the same consisting of a segmental body-bar provided with an outward extension adapted to receive a saw and forming a space in the contact-face of said body-bar, clamping-yokes having slidable connection with the body-bar, provided at one end with a cam-face and at the opposite end with an adjusting-screw, and levers provided with cam-faces, adapted for engagement with the similar faces of the clamping-yokes, the said levers serving to shift the clamping-yokes and lock them in their shifted position, substantially as shown and described.

4. In a rim-clamp for wheels, the combination with a body-bar, of a fastening device provided at one end with a cam inner face, and at the opposite end with an adjusting-screw, and a cam-lever mounted between the body-bar and the end of the fastening device having a cam-face, substantially as described.

5. In a rim-clamp for wheels, the combination with a body-bar provided with a spindle mounted to slide therein, of a yoke-shaped fastening device provided at one end with an eye having a cam inner face, and at its other end with an adjusting-screw, and a lock-lever having a cam-surface and mounted on the spindle between the body and the cam-face of the eye of the yoke, substantially as described.

CHARLES SCHALLES.

Witnesses:
HENRY A. HARRISON,
HERMAN DE VRIES.